United States Patent

[11] 3,591,257

| [72] | Inventors | Walter Mandler;<br>Garry Edwards; Erich Wagner, all of<br>Midland, Ontario, Canada |
|---|---|---|
| [21] | Appl. No | 833,063 |
| [22] | Filed | July 13, 1969 |
| [45] | Patented | July 6, 1971 |
| [73] | Assignee | Ernst Leitz GmbH<br>Wetzlar, Germany |
| [32] | Priority | June 15, 1968 |
| [33] | | Germany |
| [31] | | P 17 72 665.7 |

[54] OBJECTIVE HAVING LONG BACK FOCAL DISTANCE WITH REGARD TO ITS FOCAL LENGTH
6 Claims, 33 Drawing Figs.

[52] U.S. Cl. .................................................. 350/215,
350/209, 350/225
[51] Int. Cl. ........................................................ G02b 9/62
[50] Field of Search ............................................ 350/209,
215, 225

[56] References Cited
UNITED STATES PATENTS

| 2,734,424 | 2/1956 | Bertele | 350/215 |
| 3,132,199 | 5/1964 | Zimmermann et al. | 350/215 X |

FOREIGN PATENTS

| 878,879 | 10/1961 | Great Britain | 350/215 |
| 924,914 | 5/1963 | Great Britain | 350/215 |
| 1,111,533 | 5/1968 | Great Britain | 350/225 |

*Primary Examiner*—David Schonberg
*Assistant Examiner*—Paul A. Sacher
*Attorney*—Krafft and Wells ABSTRACT: A photographic objective having a relatively long back focal distance with regard to its focal length and also having a great relative opening comprising in combination in front of the diaphragm a negative lens group comprising at least one component lens and spaced therefrom a preferably cemented positive lens element which comprises at least two component lenses having opposite refractive power. Behind the diaphragm a negative lens group is disposed which comprises at least one component lens.

INVENTORS
WALTER MANDLER
BY GARY EDWARDS
ERICH WAGNER
Krafft + Wells

OBJECTIVE HAVING LONG BACK FOCAL DISTANCE WITH REGARD TO ITS FOCAL LENGTH

CROSS-REFERENCE TO RELATED APPLICATION

Applicants claim priority under 35 USC 119 for application P 17 72 665.7 filed June 15, 1968 in the Patent Office of the Federal Republic of Germany.

BACKGROUND OF THE INVENTION

Our present invention relates to photographic objectives, more specifically to wide-angle objectives having a long back focal distance and a great relative opening.

It is well known in the art that the use of wide-angle objectives in combination with single lens reflex camera is rendered considerably difficult, owing to the space required in the cameras for the tilting of the reflex mirror, as a consequence whereof the objectives have to have a rather long back focal distance. For this reason, it has already been suggested to design such wide-angle objectives in the manner of inverted telephoto lenses, so-called retrofocus lenses. However, this type of objective presents considerable difficulties in color correction with regard to the lateral aberrations. Besides, with this type only rather small relative openings can be attained if oversized dimensions are to be avoided.

Further, there has been suggested to design the objectives in question in symmetry to the diaphragm disposing on either side of the diaphragm positive lens groups and, noticeably spaced therefrom, negative lens groups, preferably negative menisci. Such objectives offer indeed good possibilities for correction, however, only objectives of short back focal distances can be obtained this way, and they render the objectives unsuitable for use with single lens reflex cameras. Unfortunately, any increase of the back focal distance leads to a reduction of the relative opening.

It is, therefore, an object of the present invention to provide objectives which overcome the above-mentioned disadvantages, and it is a further object to provide objectives which are inexpensive in manufacture, even if the objectives comprise relatively many component lenses.

SUMMARY OF THE INVENTION

The above stated objects are attained with objectives comprising in combination in front of the diaphragm a negative lens group consisting of at least one component lens and spaced therefrom a positive lens element, preferably cemented from at least two component lenses having opposite refractory power, and further comprising a negative lens group consisting of at least one component lens behind the diaphragm. Preferably, the negative lens group mounted in front of the diaphragm includes exclusively refracting surfaces of which the centers of curvature are positioned in the direction towards the diaphragm. The surface adjacent the diaphragm of the negative lens group directly behind this diaphragm and the surface adjacent the image plane also have their centers of curvature positioned in the direction towards the diaphragm. Their radii are to be shorter than the total focal length. The object-side negative lens group may comprise a plurality of menisci with their concave surfaces being directed towards the diaphragm. The total focal length of these menisci is to be greater than the total focal length of the assembled objective. The focal length of the positive lens group in front of the diaphragm is to be smaller than the focal length of the entire objective.

DESCRIPTION OF THE DRAWINGS

In Examples 1 to 6 are mentioned the exact data of six objectives designed according to the invention. In the appending drawings.

Objectives of the above described type have a back focal length which amounts to at least two-thirds of the total focal length of each particular objective.

From the field angles mentioned in the tables provided in the Examples, the efficiency of the new designing principle will be readily apparent. Even if only a total of four component lenses is used a relative opening of $f{:}4$ can be achieved together with a picture angle of $\pm15°$.

The following specific examples give the data of six objectives designed according to the invention:

EXAMPLE 1

Figure 1:
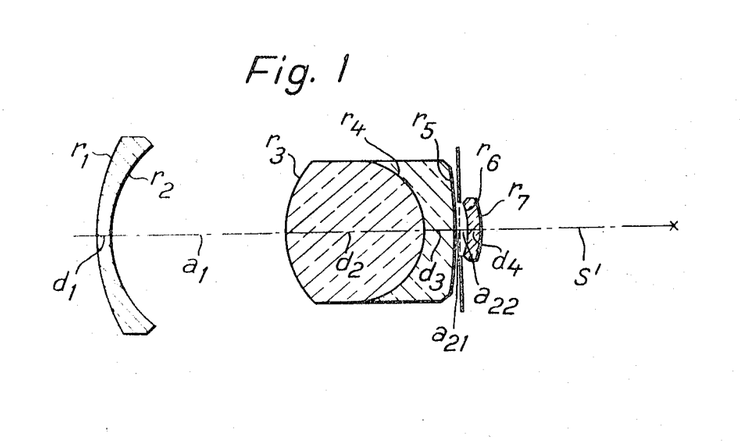
FIGS. 1—5 are axial sectional views of the objectives designed according to the data in Examples 1—6.
Figure 1A:
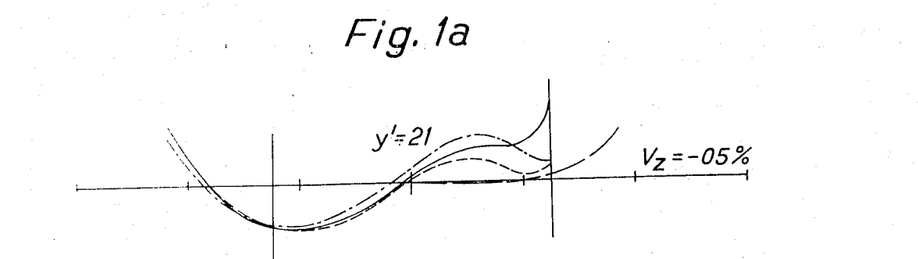
Figure 1B:
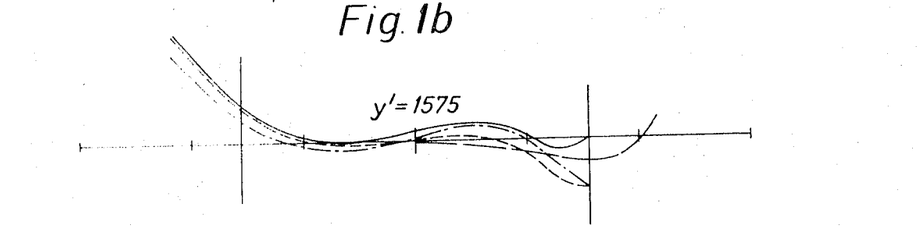
Figure 1C:
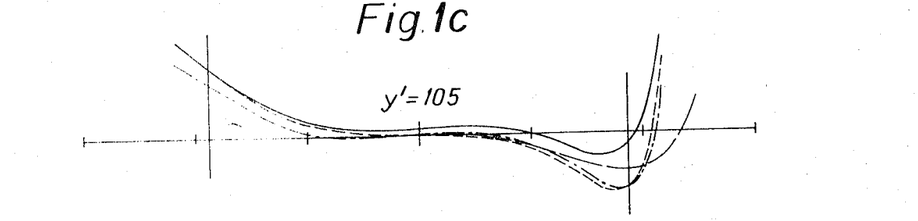
Figure 1D:
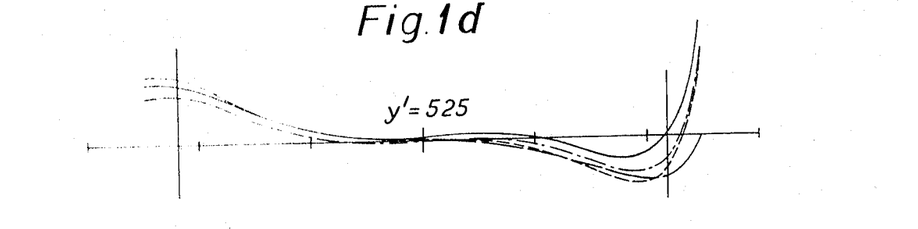
Figure 1E:
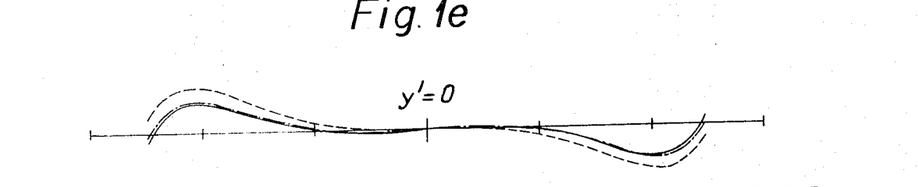

The data of the radii $r_n$, lens spacings $a_n$, lens thicknesses $d_n$, focal lengths $f_n$ and back focal distance $s'$ are as follows:

[Focal length=100; Field angle=$\pm19.5°$; Relative opening=$f{:}4$]

| | | |
|---|---|---|
| $r_1=+73.20$ | $d_1=4.97$ | $f_1=-150.4$ |
| $r_2=+42.85$ | $a_1=66.20$ | |
| $r_3=+38.50$ | $d_2=51.95$ | $f_{1,2}=+56.2$ |
| $r_4=-26.28$ | $d_3=11.92$ | $f_2=+59.9$ |
| $r_5=-153.3$ | $a_{21}=1.65$ [1] | |
| | $a_{22}=3.19$ [1] | |
| $r_6=-22.36$ | $d_4=4.47$ | $f_3=-106.9$ |
| $r_7=-33.90$ | $s'=72.8$ | |

[1] Space in front and behind said diaphragm.

EXAMPLE 2

Figure 2:
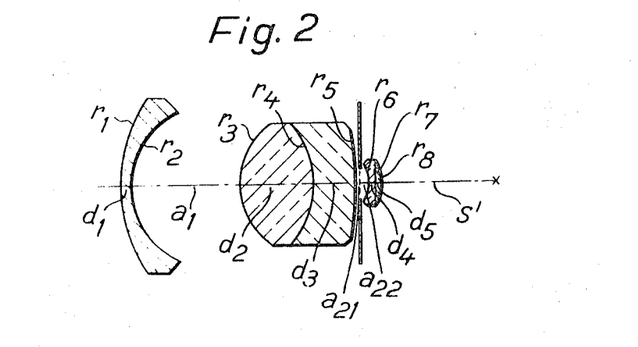
Figure 2A:
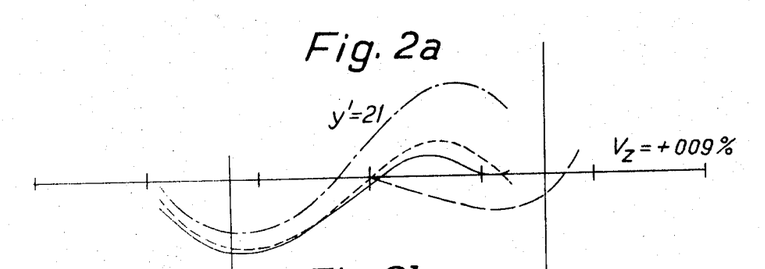
FIGS. 2a—e to 5a—d are graphs showing the state of correction of the corresponding objectives.
Figure 2B:
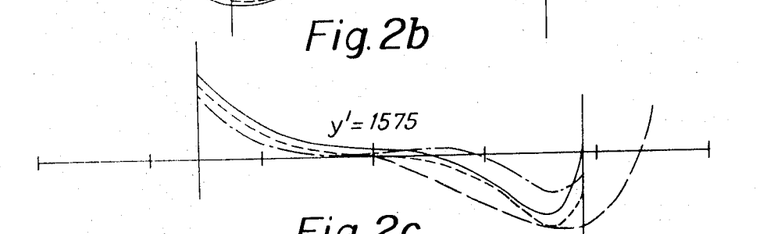
Figure 2C:
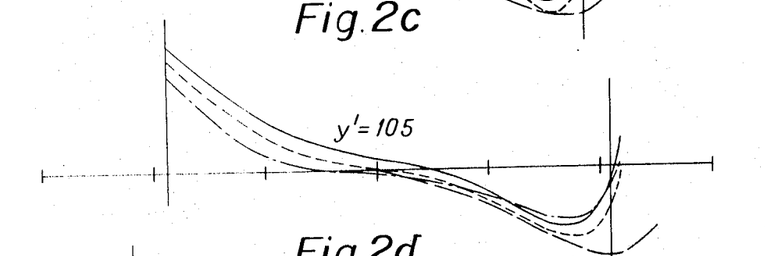
Figure 2D:
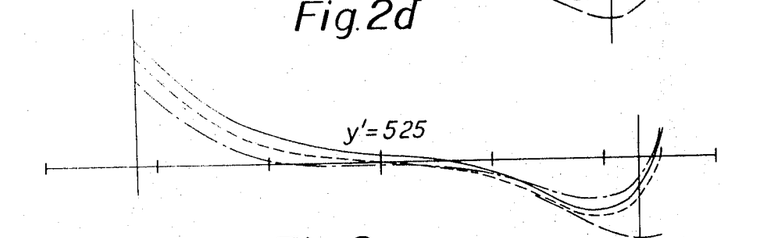
Figure 2E:
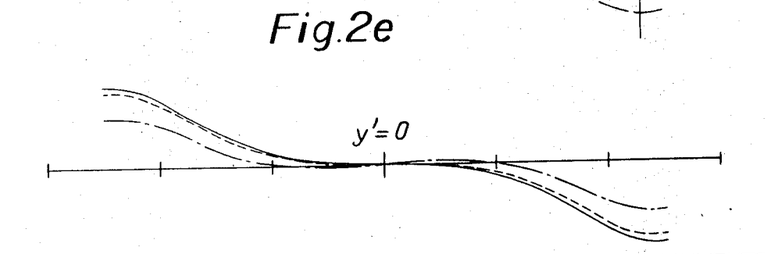

The data of the radii $r_n$, lens spacings $a_n$, lens thicknesses $d_n$, focal lengths $f_n$, back focal distance $s'$ and glass types having a refractive index $n_e$ and Abbe number $v_e$ are as follows:

[Focal length=100; Field angle=$\pm31°$; Relative opening=$f{:}4$]

| | | $n_e$ | $v_e$ | |
|---|---|---|---|---|
| $r_1=+99.80$ | $d_1=5.94$ | 1.76256 | 31.58 | $f_1=-160.8$ |
| $r_2=+53.61$ | $a_1=71.20$ | | | |
| $r_3=+48.17$ | $d_2=48.95$ | 1.67133 | 41.64 | $f_{1,2}=+66.9$ |
| $r_4=-58.18$ | $d_3=27.70$ | 1.76859 | 26.31 | $f_2=+69.4$ |
| $r_5=-204.5$ | $a_{21}=1.71$ [1] | | | |
| | $a_{22}=5.72$ [1] | | | |
| $r_6=-22.80$ | $d_4=2.36$ | 1.62408 | 36.11 | $f_3=-203.0$ |
| $r_7=+214.0$ | $d_5=4.64$ | 1.56181 | 60.96 | |
| $r_8=-27.79$ | $s'=74.7$ | | | |

[1] Space in front and behind said diaphragm.

EXAMPLE 3

Figure 3:
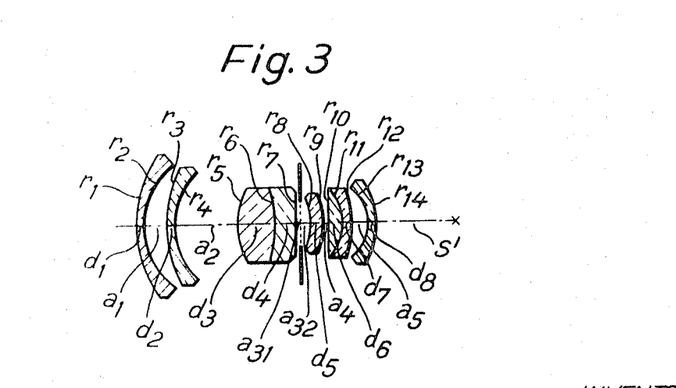
Figure 3A:
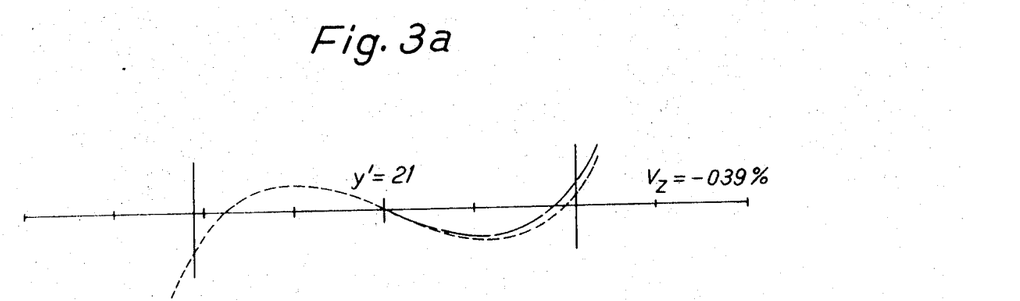
Figure 3B:
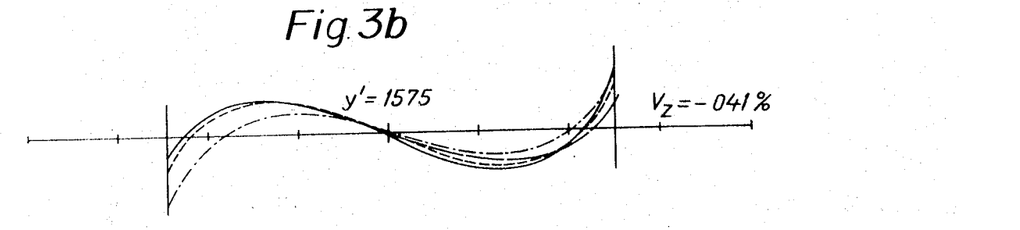
Figure 3C:
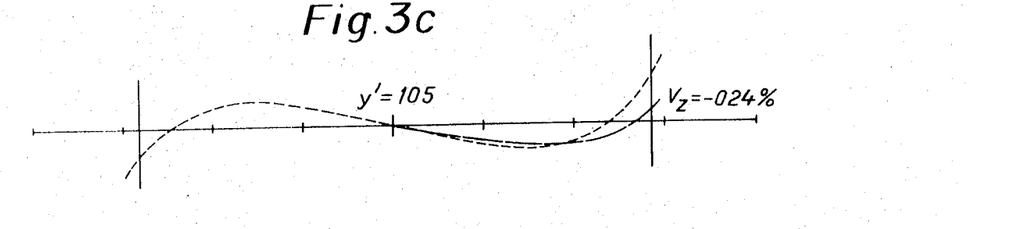
Figure 3D:
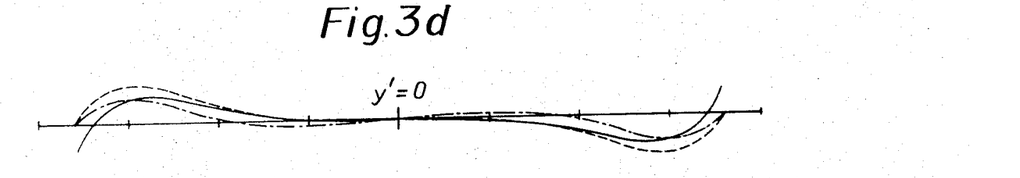

The data of the radii $r_n$, lens spacings $a_n$, lens thicknesses $d_n$, focal lengths $f_n$, back focal distance $s'$ and glass types having a refractive index $n_e$ and Abbē number $v_e$ are as follows:

[Focal length=100; Field angle=±37°; Relative opening=f:2.8]

|  |  | $n_e$ | $v_e$ |  |
|---|---|---|---|---|
| $r_1=+98.79$ |  |  |  |  |
| $r_2=+61.20$ | $d_1=5.43$ | 1.62286 | 60.08 | $f_1=-126.5$ |
|  | $a_1=9.86$ |  |  |  |
| $r_3=+101.6$ |  |  |  |  |
| $r_4=+60.75$ | $d_2=5.43$ | 1.62286 | 60.08 |  |
|  | $a_2=51.20$ |  |  |  |
| $r_5=+60.10$ |  |  |  | $f_{1,2}=+79.3$ |
|  | $d_3=30.72$ | 1.79227 | 47.15 |  |
| $r_6=-91.20$ | $d_4=17.61$ | 1.81265 | 25.24 | $f_2=+71.4$ |
| $r_7=-549.3$ |  |  |  |  |
|  | $a_{31}=2.14$ [1] |  |  |  |
|  | $a_{32}=8.35$ [1] |  |  |  |
| $r_8=-56.39$ | $d_5=11.29$ | 1.62286 | 60.08 |  |
| $r_9=-71.58$ |  |  |  |  |
|  | $a_4=2.34$ |  |  |  |
| $r_{10}=+3330.0$ |  |  |  |  |
|  | $d_6=13.61$ | 1.72823 | 37.85 |  |
| $r_{11}=-36.08$ | $d_7=6.00$ | 1.81265 | 25.24 | $f_3=-376.0$ |
| $r_{12}=-100.5$ |  |  |  |  |
|  | $a_5=13.61$ |  |  |  |
| $r_{13}=-34.62$ |  |  |  |  |
|  | $d_8=5.43$ | 1.62408 | 36.11 |  |
| $r_{14}=-61.00$ | $s'=65.70$ |  |  |  |

[1] Space in front and behind said diaphragm.

EXAMPLE 4

Figure 4:
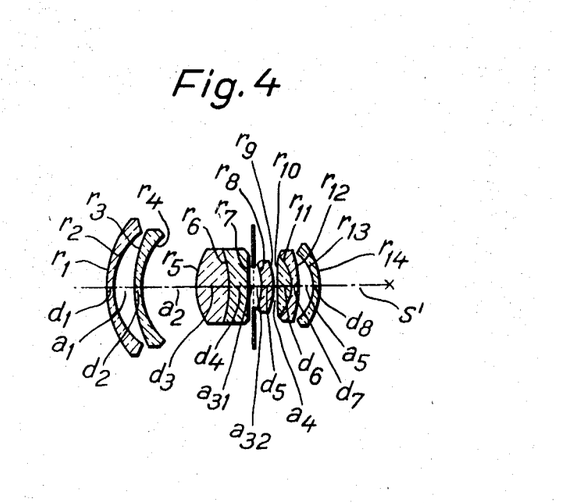
Figure 4A:
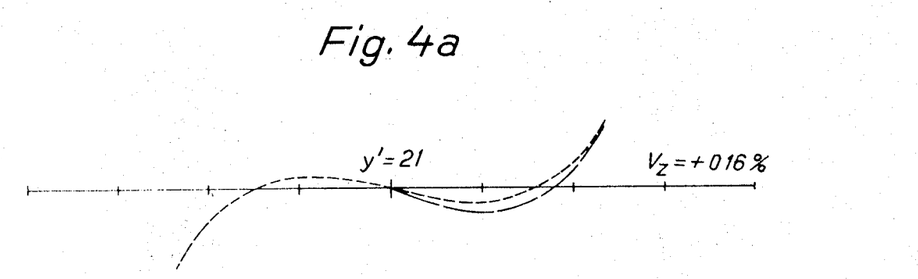
Figure 4B:
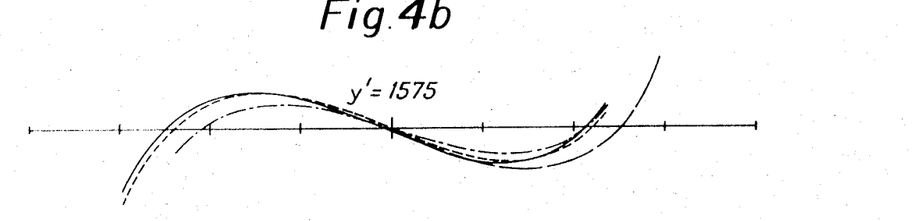
Figure 4C:
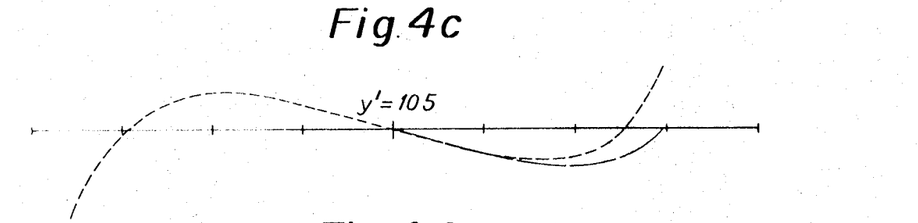
Figure 4D:
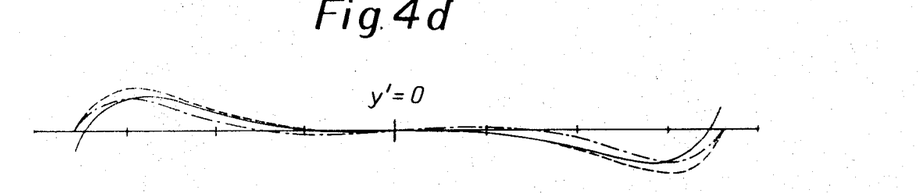

The data of the radii $r_n$, lens spacings $a_n$, lens thicknesses $d_n$, focal lengths $f_n$, back focal distance $s'$ and glass types having a refractive index $n_e$ and Abbe number $v_e$ are as follows:

[Focal length=100; Field angle=±40°; Relative opening=f:2.8]

|  |  | $n_e$ | $v_e$ |  |
|---|---|---|---|---|
| $r_1=+94.39$ |  |  |  |  |
| $r_2=+63.17$ | $d_1=5.44$ | 1.62286 | 60.08 | $f_1=-134.4$ |
|  | $a_1=19.88$ |  |  |  |
| $r_3=+116.93$ |  |  |  |  |
| $r_4=+64.63$ | $d_2=5.44$ | 1.62286 | 60.08 |  |
|  | $a_2=51.16$ |  |  |  |
| $r_5=+59.67$ |  |  |  | $f_{1,2}=+85.6$ |
|  | $d_3=30.72$ | 1.79227 | 47.15 |  |
| $r_6=-99.37$ | $d_4=17.56$ | 1.81265 | 25.24 | $f_2=+74.0$ |
| $r_7=-1422.18$ |  |  |  |  |
|  | $a_{31}=2.12$ [1] |  |  |  |
|  | $a_{32}=8.30$ [1] |  |  |  |
| $r_8=-51.20$ | $d_5=11.28$ | 1.62286 | 60.08 |  |
| $r_9=-62.40$ |  |  |  |  |
|  | $a_4=2.32$ |  |  |  |
| $r_{10}=+1550.45$ |  |  |  |  |
|  | $d_6=13.6$ | 1.72823 | 37.85 |  |
| $r_{11}=-36.06$ | $d_7=6.0$ | 1.81265 | 25.24 | $f_3=-672.8$ |
| $r_{12}=-99.05$ |  |  |  |  |
|  | $a_5=13.6$ |  |  |  |
| $r_{13}=-35.52$ |  |  |  |  |
|  | $d_8=5.44$ | 1.62408 | 36.11 |  |
| $r_{14}=-61.25$ | $s'=64.64$ |  |  |  |

[1] Space in front and behind said diaphragm.

EXAMPLE 5

Figure 5:
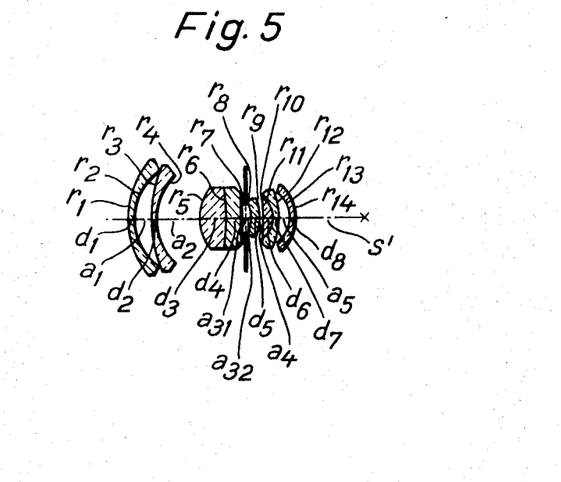
Figure 5A:
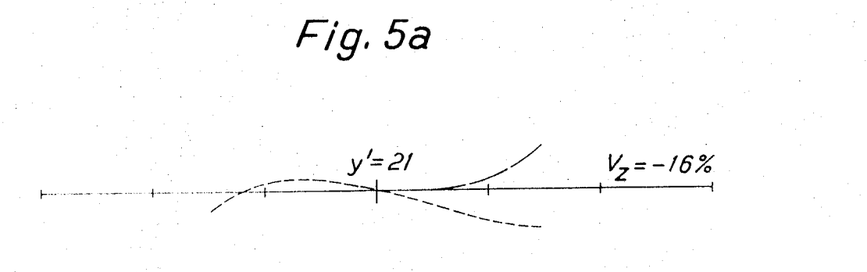
Figure 5B:
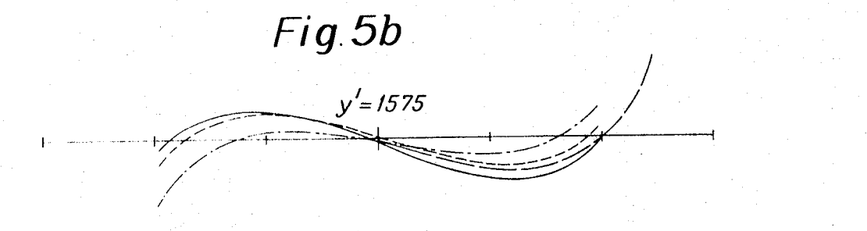
Figure 5C:
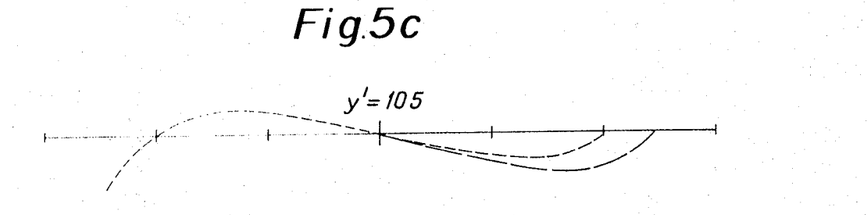
Figure 5D:
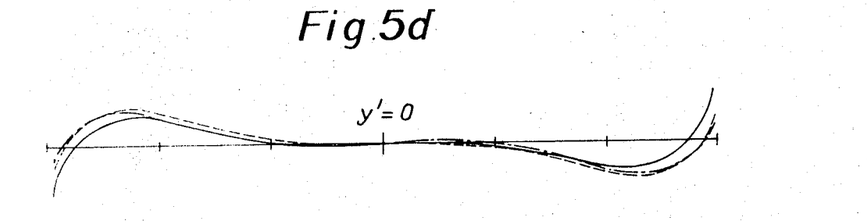
Figure 6A:
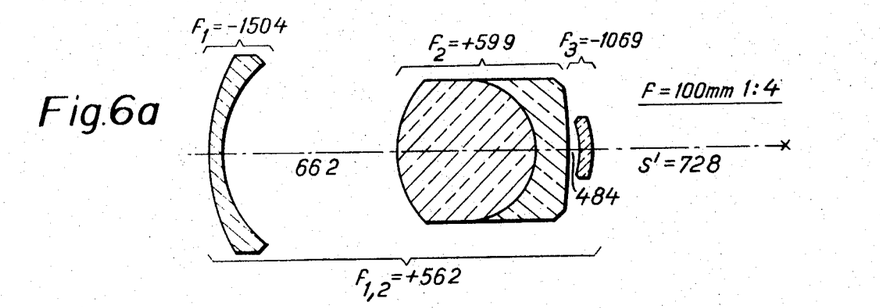
FIGS. 6a—f are a comparison drawing of these six objectives wherein also the focal lengths of the three individual lens groups are provided which each objective comprises, and wherein, further, the focal lengths of the lens groups are given which are positioned in front of the diaphragm.
Figure 6B:
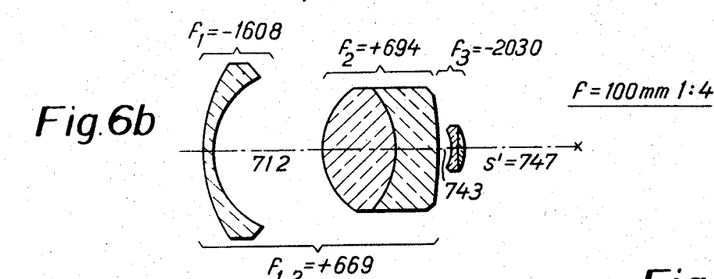
Figure 6C:
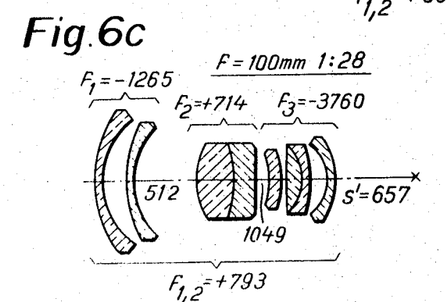
Figure 6D:
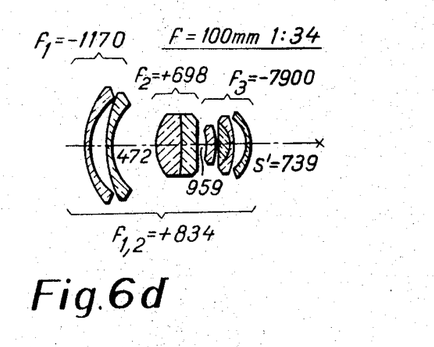
Figure 6E:
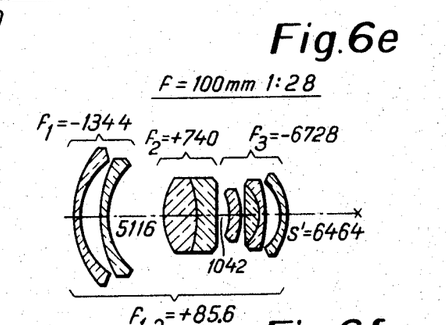
Figure 6F:
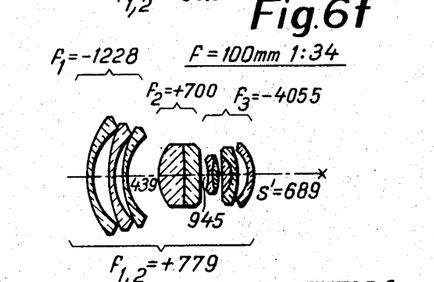

The data of the radii $r_n$, lens spacings $a_n$, lens thicknesses $d_n$, focal lengths $f_n$, back focal distance $s'$ and glass types having a refractive index $n_e$ and Abbé number $v_e$ are as follows:

[Focal length=100; Field angle=±45°; Relative opening=f:3.4]

|  |  | $n_e$ | $v_e$ |  |
|---|---|---|---|---|
| $r_1=+98.3$ |  |  |  |  |
| $r_2=+61.23$ | $d_1=5.0$ | 1.59263 | 40.66 | $f_1=-117.0$ |
|  | $a_1=18.3$ |  |  |  |
| $r_3=+133.3$ |  |  |  |  |
| $r_4=+63.27$ | $d_2=5.0$ | 1.59263 | 40.66 |  |
|  | $a_2=47.2$ |  |  |  |
| $r_5=+52.00$ |  |  |  | $f_{1,2}=+83.4$ |
|  | $d_3=28.3$ | 1.74795 | 44.49 |  |
| $r_6=-189.3$ | $d_4=16.2$ | 1.76817 | 26.74 | $f_2=+69.8$ |
| $r_7=\pm\infty$ |  |  |  |  |
|  | $a_{31}=2.85$ [1] |  |  |  |
|  | $a_{32}=6.74$ [1] |  |  |  |
| $r_8=-46.08$ | $d_5=10.4$ | 1.56205 | 46.88 |  |
| $r_9=-61.23$ |  |  |  |  |
|  | $a_4=2.17$ |  |  |  |
| $r_{10}=-1365.0$ |  |  |  |  |
|  | $d_6=12.5$ | 1.68585 | 47.92 |  |
| $r_{11}=-26.83$ | $d_7=5.6$ | 1.76847 | 26.74 | $f_3=-790.0$ |
| $r_{12}=-81.37$ |  |  |  |  |
|  | $a_5=12.5$ |  |  |  |
| $r_{13}=-32.98$ |  |  |  |  |
|  | $d_8=5.0$ | 1.56181 | 60.96 |  |
| $r_{14}=-49.65$ | $s'=73.9$ |  |  |  |

[1] Space in front and behind said diaphragm.

EXAMPLE 6

The photographic objective has the following specifications:

the focal length is 100,
the field angle is ±50°,
the relative opening is f:3.4,
and wherein
the comprised negative front lens element consists of three single menisci which are concave in the direction towards the diaphragm,
said menisci having
a focal length $f_1=-122.8$, said negative front lens element being spaced from the subsequent positive cemented lens element by a distance $a_1=43.9$, said positive lens element having a focal length $f_2=+70.0$, the space in front and behind said diaphragm is $a_2=9.45$, the comprised negative lens element behind said diaphragm consists of three menisci which are concave in the direction towards said diaphragm and of which two menisci are cemented and one is a single meniscus, the focal length of said lens element being $f_3=-405.5$, the back focal distance is $s'=68.9$, the focal length is $f_{1,2}=+77.9$

What we claim is:
1. A wide-angle photographic objective for transmitting the image of an object through a diaphragm to an image plane, said objective having a relatively long back focal distance with regard to its focal cal length and a great relative opening, said objective consisting of in combination:
  first negative lens means positioned between said object and said diaphragm;
  cemented positive lens means having at least two lenses having opposite refractive power, said positive lens means positioned between said first negative lens means and said diaphragm;
  second negative lens means positioned between said diaphragm and said image plane, wherein
the focal length is 100,
the field angle is ±50°,
the relative opening is $f$:3.4,
and wherein
said first negative lens means consists of three single menisci which are concave in the direction towards the diaphragm, said menisci having a focal length $f_1 = -22.8$,
said first negative lens means being spaced from said positive lens means by a distance $a_1 = 43.9$,
said positive lens means having a focal length $f_2 = +70.0$,
the space in front and behind said diaphragm is $a_2 = 9.45$,
said second negative lens means consists of three menisci which are concave in the direction towards said diaphragm and of which two menisci are cemented and one is a single meniscus, the focal length of said lens means being $f_3 = -405.5$,
the back focal distance is $s' = 68.9$,
the focal length is $f_{1,2} = +77.9$.

2. A wide-angle photographic objective for transmitting the image of an object through a diaphragm to an image plane, said objective having a relatively long back focal distance with regard to its focal length and a great relative opening, said objective consisting of in combination:
first negative lens means positioned between said object and said diaphragm;
cemented positive lens means having at least two lenses having opposite refractive power, said positive lens means positioned between said first negative lens means and said diaphragm; and
second negative lens means positioned between said diaphragm and said image plane, wherein the data of the radii $r_n$, lens spacings $a_n$, lens thicknesses $d_n$, focal lengths $f_n$ and back focal distance $s^1$ are as follows:

[Focal length = 100; Field angle = ± 19.5°; Relative opening = $f$:4]

| | | |
|---|---|---|
| $r_1 = +73.20$ | $d_1 = 4.97$ | $f_1 = -150.4$ |
| $r_2 = +42.85$ | $a_1 = 66.20$ | |
| $r_3 = +38.50$ | $d_2 = 51.95$ | $f_{1,2} = +56.2$ |
| $r_4 = -26.28$ | $d_3 = 11.92$ | $f_2 = +59.9$ |
| $r_5 = -153.3$ | $a_{21} = 1.65^1$ | |
| | $a_{22} = 3.19^1$ | |
| $r_6 = -22.36$ | $d_4 = 4.47$ | $f_3 = -106.9$ |
| $r_7 = -33.90$ | $s^1 = 72.8$ | |

[1] Space in front and behind said diaphragm.

3. A wide-angle photographic objective for transmitting the image of an object through a diaphragm to an image plane, said objective having a relatively long back focal distance with regard to its focal length and a great relative opening, said objective consisting of in combination;
first negative lens means positioned between said object and said diaphragm;
cemented positive lens means having at least two lenses having opposite refractive power, said positive lens means positioned between said first negative lens means and said diaphragm; and
second negative lens means positioned between said diaphragm and said image plane, wherein the data of the radii $r_n$, lens spacings $a_n$, lens thicknesses $d_n$, focal lengths $f_n$, back focal distance $s'$ and glass types having a refractive index $n_e$ and Abbé number $v_e$ are as follows:

[Focal length=100; Field angle=±31°; Relative opening=$f$:4]

| | | $n_e$ | $v_e$ | |
|---|---|---|---|---|
| $r_1 = +99.80$ | $d_1 = 5.94$ | 1.76256 | 31.58 | $f_1 = -160.8$ |
| $r_2 = +53.61$ | $a_1 = 71.20$ | | | |
| $r_3 = +48.17$ | $d_2 = 48.95$ | 1.67133 | 41.64 | $f_{1,2} = +66.9$ |
| $r_4 = -58.18$ | $d_3 = 27.70$ | 1.76859 | 26.31 | $f_2 = +69.4$ |
| $r_5 = -204.5$ | $a_{21} = 1.71^1$ | | | |
| | $a_{22} = 5.72^1$ | | | |
| $r_6 = -22.80$ | $d_4 = 2.36$ | 1.62408 | 36.11 | |
| $r_7 = +214.0$ | $d_5 = 4.64$ | 1.56181 | 60.96 | $f_3 = -203.0$ |
| $r_8 = -27.79$ | $s' = 74.7$ | | | |

[1] Space in front and behind said diaphragm.

4. A wide-angle photographic objective for transmitting the image of an object through a diaphragm to an image plane, said objective having a relatively long back focal distance with regard to its focal length and a great relative opening, said objective consisting of in combination:
first negative lens means positioned between said object and said diaphragm;
cemented positive lens means having at least two lenses having opposite refractive power, said positive lens means positioned between said first negative lens means and said diaphragm; and
second negative lens means positioned between said diaphragm and said image plane, wherein the data of the radii $r_n$, lens spacings $a_n$, lens thicknesses $d_n$, focal lengths $f_n$, back focal distance $s'$ and glass types having a refractive index $n_e$ and Abbé number $v_e$ are as follows:

[Focal length=100; Field angle=±37°; Relative opening=$f$:2.8]

| | | $n_e$ | $v_e$ | |
|---|---|---|---|---|
| $r_1 = +98.79$ | $d_1 = 5.43$ | 1.62286 | 60.08 | $f_1 = -126.5$ |
| $r_2 = +61.20$ | $a_1 = 9.86$ | | | |
| $r_3 = +101.6$ | $d_2 = 5.43$ | 1.62286 | 60.08 | $f_{1,2} = +79.3$ |
| $r_4 = +60.75$ | $a_2 = 51.20$ | | | |
| $r_5 = +60.10$ | $d_3 = 30.72$ | 1.79227 | 47.15 | $f_2 = +71.4$ |
| $r_6 = -91.20$ | $d_4 = 17.61$ | 1.81265 | 25.24 | |
| $r_7 = -549.3$ | $a_{31} = 2.14^1$ | | | |
| | $a_{32} = 8.35^1$ | | | |
| $r_8 = -56.39$ | $d_5 = 11.29$ | 1.62286 | 60.08 | |
| $r_9 = -71.58$ | $a_4 = 2.34$ | | | |
| $r_{10} = +3330.0$ | $d_6 = 13.61$ | 1.72823 | 37.85 | $f_3 = -376.0$ |
| $r_{11} = -36.08$ | $d_7 = 6.00$ | 1.81265 | 25.24 | |
| $r_{12} = -100.5$ | $a_5 = 13.61$ | | | |
| $r_{13} = -34.62$ | $d_8 = 5.43$ | 1.62408 | 36.11 | |
| $r_{14} = -61.00$ | $s_1 = 65.70$ | | | |

[1] Space in front and behind said diaphragm.

5. A wide-angle photographic objective for transmitting the image of an object through a diaphragm to an image plane, said objective having a relatively long back focal distance with regard to its focal length and a great relative opening, said objective consisting of in combination:
first negative lens means positioned between said object and said diaphragm;

cemented positive lens means having at least two lenses having opposite refractive power, said positive lens means positioned between said first negative lens means and said diaphragm; and second negative lens means positioned between said diaphragm and said image plane, wherein the data of the radii $r_n$, lens spacing $a_n$, lens thicknesses $d_n$, focal lengths $f_n$, back focal distance $s'$ and glass types having a refractive index $n_e$ and Abbe number $v_e$ are as follows:

[Focal length=100; Field angle=±40°; Relative opening=f:2.8]

|  |  | $n_e$ | $v_e$ |  |
|---|---|---|---|---|
| $r_1=+94.39$ |  |  |  |  |
|  | $d_1=5.44$ | 1.62286 | 60.08 |  |
| $r_2=+63.17$ |  |  |  | $f_1=-134.4$ |
|  | $a_1=19.88$ |  |  |  |
| $r_3=+116.93$ |  |  |  |  |
|  | $d_2=5.44$ | 1.62286 | 60.08 |  |
| $r_4=+64.63$ |  |  |  | $f_{1,2}=+85.6$ |
|  | $a_2=51.16$ |  |  |  |
| $r_5=+59.67$ |  |  |  |  |
|  | $d_3=30.72$ | 1.79227 | 47.15 |  |
| $r_6=-99.37$ |  |  |  | $f_2=+74.0$ |
|  | $d_4=17.56$ | 1.81265 | 25.24 |  |
| $r_7=-1422.18$ |  |  |  |  |
|  | $a_{31}=2.12$ [1] |  |  |  |
|  | $a_{32}=8.30$ [1] |  |  |  |
| $r_8=-51.20$ |  |  |  |  |
|  | $d_5=11.28$ | 1.62286 | 60.08 |  |
| $r_9=-62.40$ |  |  |  |  |
|  | $a_4=2.32$ |  |  |  |
| $r_{10}=+1550.45$ |  |  |  |  |
|  | $d_6=13.6$ | 1.72823 | 37.85 |  |
| $r_{11}=-36.06$ |  |  |  | $f_3=-672.8$ |
|  | $d_7=6.0$ | 1.81265 | 25.24 |  |
| $r_{12}=-99.05$ |  |  |  |  |
|  | $a_5=13.6$ |  |  |  |
| $r_{13}=-35.52$ |  |  |  |  |
|  | $d_8=5.44$ | 1.62408 | 36.11 |  |
| $r_{14}=-61.25$ |  |  |  |  |
|  | $s'=64.64$ |  |  |  |

[1] Space in front and behind said diaphragm.

6. A wide-angle photographic objective for transmitting the image of an object through a diaphragm to an image plane, said objective having a relatively long back focal distance with regard to its focal length and a great relative opening, said objective consisting of in combination;

first negative lens means positioned between said object and said diaphragm;

cemented positive lens means having at least two lenses having opposite refractive power, said positive lens means positioned between said first negative lens means and said diaphragm; and second negative lens means positioned between said diaphragm and said image plane, wherein the data of the radii $r_n$, lens spacings $a_n$, lens thicknesses $d_n$, focal lengths $f_n$, back focal distance $s'$ and glass types having a refractive index $n_e$ and Abbe number $v_e$ are as follows:

[Focal length=100; Field angle=±45°; Relative opening f:3.4]

|  |  | $n_e$ | $v_e$ |  |
|---|---|---|---|---|
| $r_1$ +98.3 |  |  |  |  |
|  | $d_1$ 5.0 | 1.59263 | 40.66 |  |
| $r_2$ +61.23 |  |  |  | $f_1=-117.0$ |
|  | $a_1$ −18.3 |  |  |  |
| $r_3$ +133.3 |  |  |  |  |
|  | $d_2$ 5.0 | 1.59263 | 40.66 |  |
| $r_4$ +63.27 |  |  |  | $f_{1,2}=+83.4$ |
|  | $a_2$ 47.2 |  |  |  |
| $r_5$ +52.00 |  |  |  |  |
|  | $d_3$ 28.3 | 1.74795 | 44.49 |  |
| $r_6$ −189.3 |  |  |  | $f_2=+69.8$ |
|  | $d_4$ −16.2 | 1.76847 | 26.74 |  |
| $r_7$ ±∞ |  |  |  |  |
|  | $a_{31}=2.85$ [1] |  |  |  |
|  | $a_{32}=6.74$ [1] |  |  |  |
| $r_8=-46.08$ |  |  |  |  |
|  | $d_5=10.4$ | 1.56295 | 46.88 |  |
| $r_9$ −61.23 |  |  |  |  |
|  | $a_4=2.17$ |  |  |  |
| $r_{10}$ −1365.0 |  |  |  |  |
|  | $d_6=12.5$ | 1.68585 | 47.92 |  |
| $r_{11}$ −26.83 |  |  |  | $f_3=-790.0$ |
|  | $d_7$ 5.6 | 1.76847 | 26.74 |  |
| $r_{12}$ −81.37 |  |  |  |  |
|  | $a_5=12.5$ |  |  |  |
| $r_{13}$ −32.98 |  |  |  |  |
|  | $d_8$ 5.0 | 1.56181 | 60.96 |  |
| $r_{14}$ −49.65 |  |  |  |  |
|  | $s'=73.9$ |  |  |  |

[1] Space in front and behind said diaphragm.

UNITED STATES PATENT OFFICE
CERTIFICATE OF CORRECTION

Patent No. 3,591,257        Dated July 6, 1971

Inventor(s) Walter Mandler; Garry Edwards; Erich Wagner

It is certified that error appears in the above-identified patent and that said Letters Patent are hereby corrected as shown below:

Column 5, line 9 focal length "-22.8" should read . . -122.8 ..

Signed and sealed this 14th day of December 1971.

(SEAL)
Attest:

EDWARD M. FLETCHER, JR.          ROBERT GOTTSCHALK
Attesting Officer                Acting Commissioner of Patents